United States Patent
Bongers-Ambrosius et al.

[11] Patent Number: 6,032,749
[45] Date of Patent: Mar. 7, 2000

[54] DRILLING TOOL

[75] Inventors: Hans-Werner Bongers-Ambrosius, Munich, Germany; Rainer Batliner, Schaanwald; Dietmar Sartor, Mauren, both of Liechtenstein; Harald Geiger, Germering; Anton Knoller, Landsberg, both of Germany

[73] Assignee: Hilti Aktiengesellschaft, Schaan, Liechtenstein

[21] Appl. No.: 08/985,622

[22] Filed: Dec. 5, 1997

[30] Foreign Application Priority Data

Dec. 5, 1996 [DE] Germany ............................ 196 50 487

[51] Int. Cl.$^7$ ...................................................... E21B 10/58
[52] U.S. Cl. ............................................ 175/394; 175/415
[58] Field of Search ..................... 175/394, 415, 175/323; 408/230

[56] References Cited

U.S. PATENT DOCUMENTS 4,314,616  2/1982  Rauckhorst et al. .................... 175/394
5,492,187  2/1996  Neukirchen et al. .................... 175/394

FOREIGN PATENT DOCUMENTS 2543578  4/1977  Germany ................................ 175/394
2735227  2/1979  Germany .

*Primary Examiner*—William Neuder
*Attorney, Agent, or Firm*—Brown & Wood, LLP

[57] ABSTRACT

A drilling tool has a shank (1) at one end, a shaft (2) with two helical grooves (5, 6) and the shaft (2) extends from the shank to the other end of the drilling tool. A drill head (8), with a cutting plate (7) inserted in it, is located at the opposite end of the shaft (2) from the shank (1). The cutting plate (7) has a cutting tip (74) projecting axially outwardly from the drill head (8). The cutting plate has a dimension (B) extending perpendicularly to the axis of the drilling tool and the dimension (B) is greater than the diameter of the drill head (8). On the opposite sides of the cutting plate (7) there is a reinforcement section (71) projecting outwardly from the side of the cutting plate and spaced laterally from the ends of the grooves (5, 6) in the drill head.

9 Claims, 2 Drawing Sheets

DRILLING TOOL

BACKGROUND OF THE INVENTION

The present invention is directed to a drilling tool for drilling and/or chiseling devices, particularly for drilling in masonry, concrete, rock and similar hard materials. The drilling tool has a shank and a shaft containing two helical removal grooves with a drill head at one end of the shaft containing a cutting plate. The cutting plate is inserted into the drill head and projects in the axial direction of the shaft out of the drill head and has a dimension extending perpendicularly of the axial direction greater than the diameter of the drill head. In the region of the drill head, the removal grooves extend essentially parallel to the axis of the shaft.

It is well known for producing boreholes in a hard receiving material, such as concrete, rock, masonry and similar hard materials, to use a drilling tool as disclosed in the German Offenlegungsschrift 27 35 227 which has a cutting plate formed of a hard alloy inserted into a recess in the drill head. The cutting plate of this known drilling tool has a rectangular cross section extending essentially at right angles to the axial direction of the drilling tool. The dimension of the cutting plate extending at right angle projects radially outwardly from the drill head at two diametrically opposite sides. The cutting plate has a dimension extending parallel to the axis of the drilling tool. In the region of the cutting plate projecting outwardly from the drill head there is a cutting tip. On the opposite side the drill head from the cutting tip there is a shaft with a helical removal groove for carrying drillings out of the borehole.

In comparison to the diameter of the drilling tool, the thickness of the cutting plate perpendicular to the dimension extending across the drill head and perpendicular to the axis of the drilling tool is very small. During the drilling operation, very high stresses are developed in the opposite outer end regions of the cutting plate. On one hand, these very high stresses are caused by a high peripheral speed, and, on the other hand, by high forces acting on the cutting plate during the cutting operation. As a result, the radial end regions of the cutting plate are subject to greater wear than the central region of the cutting plate. Due to these high stresses, damage can occur to the cutting plate.

SUMMARY OF THE INVENTION

Therefore, it is the primary object of the present invention to provide a drilling tool distinguished by a long service life while avoiding damage to the cutting plate.

In accordance with the invention, the cutting plate at the drill end of the drilling tool is provided with reinforcing sections.

Because of the invention, the cutting plate is provided with a higher strength, particularly in its opposite radial end regions affording a longer service life. The reinforcing sections provide more material as the torque increases from the axis along the diameter of the drill head. From the point of view of strength, an optimum profile results with a high moment of inertia.

For uniformly distributing the forces acting on the cutting plate during the drilling operation over the full dimension of the cutting plate extending transversely of the drilling tool axis, each reinforcement section extends for approximately half of such full dimension of the cutting plate.

The forces to be absorbed by the cutting plate and the drilling tool are made up of cutting forces acting essentially on the drilling end region of the cutting plate, and of frictional forces developed at the radially opposite ends of the cutting plate. A uniform distribution of the friction forces over the whole axial dimension of the cutting plate is gained by the reinforcing sections which extend at least partially over the full axial dimension of the cutting plate.

Quick removal of the drillings cut by the cutting plate in the direction of the removal grooves is achieved preferably with a cutting plate where the axial dimension in the region of the reinforcing sections decreases with increasing thicknesses of the reinforcing sections, measured in a circumferential direction. Accordingly, the surface of the reinforcing sections, facing in the drilling direction, are inclined opposite to the drilling direction towards the removal grooves.

A very high strength and a massive construction of the cutting plate in the radially outwardly extending end regions is achieved with the dimension of the reinforcing section, measured in the circumferential direction, increasing toward the outer contour thereof.

The true concentric running of the drilling tool, necessary for accurately producing circular boreholes, is achieved by advantageously providing the surface of the reinforcing sections extending in the circumferential direction, disposed in a plane passing essentially through the center or axis of the drilling tool. Accordingly, both reinforcing sections are equal in size, have the same mass and the same rotational center of gravity.

When boreholes are drilled in a receiving material formed of different materials, it is necessary to permit the drilling tool to rotate at different speeds. Very high centrifugal forces act on the cutting plate, especially at very high rotational speeds. In the arrangement of the cutting plate of the present invention, having an angle between the free surface, facing in a circumferential direction, and the dimension of the cutting plate extending transversely of the axial direction being in the range of 20° to 60°, the cutting plate is fixed in the radial direction in a recess in the drill head.

During the drilling operation, at least some of the drillings can find their way between the reinforcing sections of the cutting plate and the wall of the borehole where they increase the friction between the drilling tool and the borehole. Such friction is prevented in an advantageous manner by providing the diameter of the enveloping curve formed by the reinforcing sections to be smaller than the dimension of the cutting plate extending transversely of the axial direction of the drilling tool. As a result, a space is created between the wall of the borehole and the reinforcing section where the drillings can move freely without interruption into the removal grooves.

Preferably, in the region of the reinforcing section at the radially outer ends of the cutting plate, a recessed section is arranged extending parallel to the axis of the drilling tool which additionally accelerates the removal of the drillings located between the cutting plate in the drill head and the wall of the borehole.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figures 1, 2:
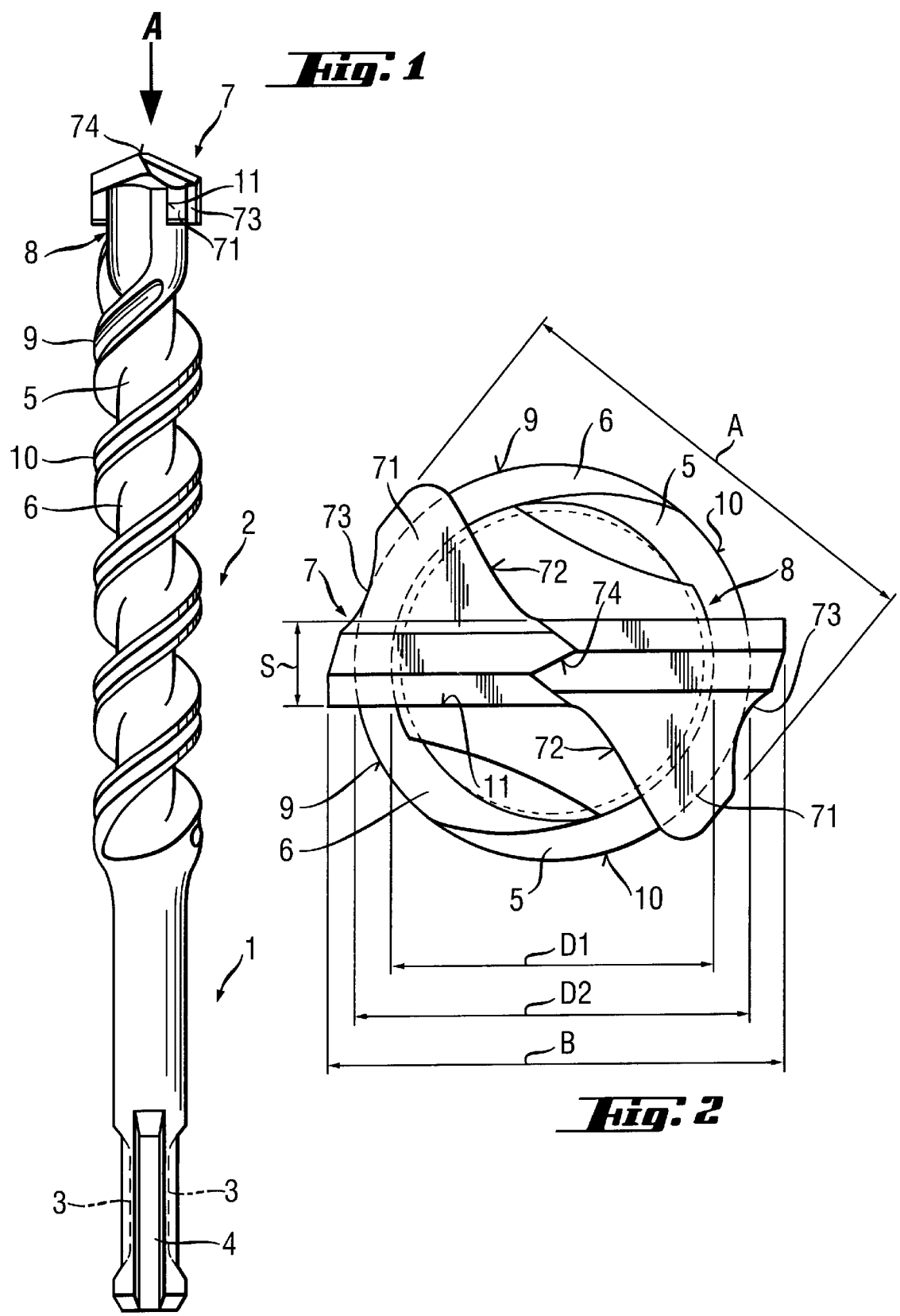
FIG. 1 is an axially extending elevational view of a drilling tool embodying the present invention and including a shank, a shaft, a drill head and a cutting plate.
FIG. 2 is an enlarged showing of the drilling tool of FIG. 1 taken in the direction of the arrow A.

In FIGS. 1 and 2 an axially extending drilling tool is shown having a first or lower end as viewed in FIG. 1 and a second or upper end. The drilling tool has an axially extending shank 1 extending from the first end to an axially extending shaft 2, a drill head 8 is located on the shaft 2 at the second end of the drilling tool and contains a cutting plate 7. In the shank 1, extending from the first end of the tool, are two diametrically opposite locking grooves 3 and two diametrically opposite driving grooves 4 with the driving grooves 4 spaced by 90° from the locking grooves. As viewed in FIG. 1, only one of the driving grooves 4 is illustrated. The driving grooves 4 and the locking grooves 3 have an essentially rectangular cross section transversely of the axis of the tool and extend parallel to the axis of the tool for a portion of the length of the shank.

The first end of the drilling tool forms a first end of the shank 1 and a second end of the shank is connected to the shaft 2 and the shaft has a diameter D2 larger than the outside diameter of the shank 1, note FIG. 2.

The shaft 2 has a first end connected to the shank 1 and a second end at the second end of the drilling tool. Two helical grooves 5, 6 for the removal of drillings or drilled material are separated from one another by two helixes 9, 10.

At the second end of the shaft 2, that is, the drilling end of the tool, there is a drill head 8 having a diameter D1 smaller than the diameter D2 of the shaft 2. In the region of the drill head 8 the grooves 5, 6 extend parallel to the axis of the drilling tool and are located on two diametrically opposite sides of the drill head. Between the two grooves 5, 6 the drill head has a recess 11 open at the second end of the drilling tool, that is, the second end of the shaft 2 in which a cutting plate 7 is secured. The cutting plate 7 has a thickness S, note FIGS. 2 and 4, where the cutting plate is shown on a larger scale than in FIG. 1. The cutting plate has a dimension B, note FIG. 2, extending perpendicularly to the axis of the drilling tool. The dimension B is greater than the diameter D2 of the shaft 2. The cutting plate 7 is fixed in the recess 11 of the drill head 8 by means of solder. It would also be possible to secure the cutting plate 7 by welding methods, such as laser welding.

Figure 4:
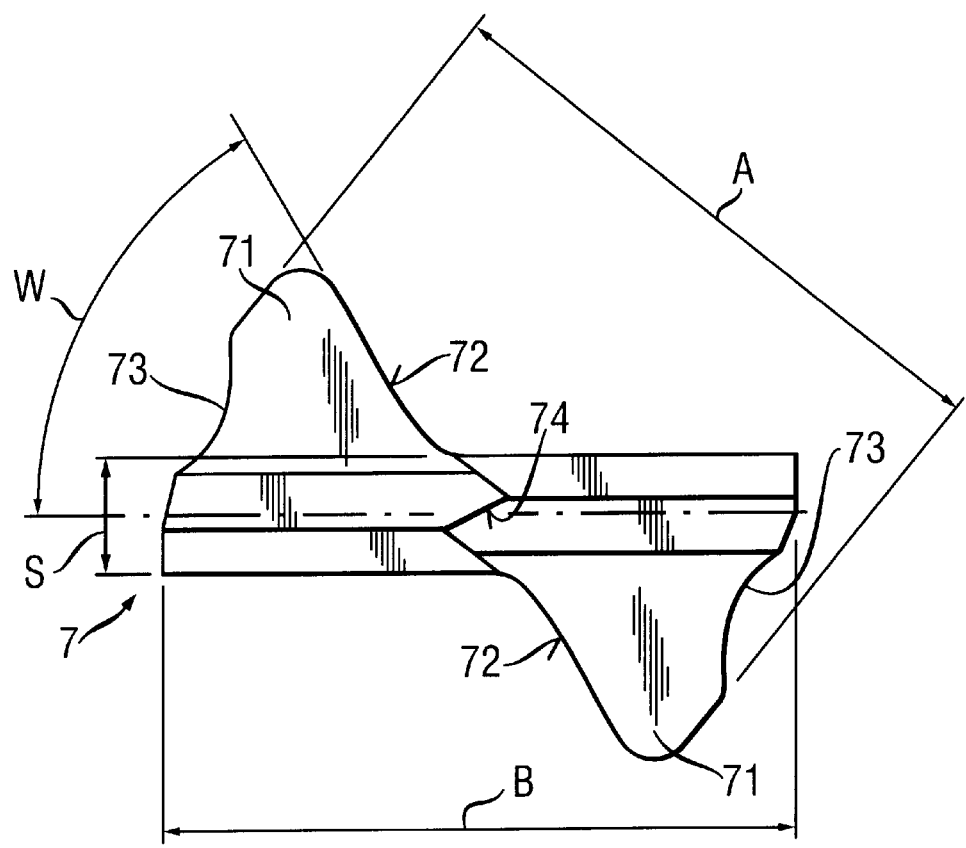
FIG. 4 is a plan view of the cutting plate as viewed in FIG. 3.

The cutting plate 7 has a cutting tip 74 leading in the drilling direction and projecting outwardly from the free end surface of the drill head 8. The cutting plate 7 has a pair of opposite ends each spaced outwardly from an opposite side of the cutting tip 74 and a pair of opposite sides extending between the opposite ends. Along each of the opposite sides the cutting plate has a reinforcing section 71, each extending from about the center of the cutting plate to a different one of the opposite ends with the reinforcing section spaced from the ends of the grooves 5, 6 in the drill head 8. Each of the reinforcing sections 71 extends essentially for half of the dimension B of the cutting plate and the dimension of the reinforcing sections 7 measured in the direction from the center of the cutting plate to its outer ends increases in the circumferential direction of the drilling tool. Each of the reinforcing section 71 has a planar first surface 72 located in a plane extending in the axial direction and passing basically through the axis of the drilling tool. As shown in FIG. 4, the angle W between the first surfaces 72 and the center of the cutting plate extending between its opposite ends is approximately 50°. The diameter A of an enveloping curve, not shown, formed by the reinforcing sections, is less than the dimension B of the cutting plate 7.

Figure 3:
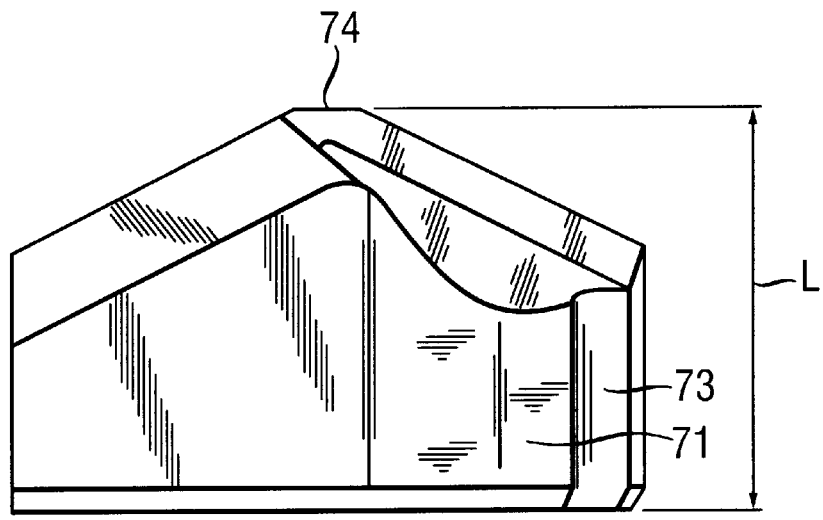
FIG. 3 is an enlarged side view of the cutting plate inserted into one end of the drilling tool shown in FIG. 1.

As shown in FIG. 3, the reinforcing sections 71 extend over a portion of the length L of the cutting plate 7, that is, the dimension of the cutting plate in the axial direction of the tool, and the length or axial dimension of the reinforcing sections 71 decreases in the direction toward the ends of the cutting plate. In each of the reinforcing sections 71 there is a second surface 73 facing towards the opposite direction from the first surface 72 and extending parallel to the axial direction of the drilling tool and facing toward the adjacent end of the cutting plate. The second surface 73 is concave or indented.

While specific embodiments of the invention have been shown and described in detail to illustrate the inventive principles, it will be understood that the invention may be embodied otherwise without departing from such principles.

We claim:

1. A drilling tool for use in a drilling device for drilling into a hard receiving material, such as for drilling masonry, concrete, rock and similar hard receiving materials and comprising an axially extending shank (1) having an axis and arranged for insertion into a chuck of a drilling device, said shank (1) having a first end and a second end spaced apart in the axial direction, an axially extending shaft (2) having an axis arranged in alignment with the axis of said shank (1) and having a first end secured to the second end of said shank and a second end, said shaft (2) having two spaced helical grooves (5, 6) in an outside surface thereof and extending between said first end and second end of said shaft, a drill head (8) having a diameter (D1) located at the second end of said shaft (2), and a cutting plate (7) inserted in said drill head (8) and projecting axially outwardly from said drill head (8), said cutting plate (7) having a pair of opposite ends each located outwardly from a circumferentially extending outside surface of said drill head and a pair of opposite sides extending between said pair of ends, said cutting plate (7) having a cutting tip (74) arranged approximately on the axis of said shaft with said cutting tip (74) located axially outwardly from said drill head, said cutting plate (7) having a dimension (B) between said pair of opposite ends and extending perpendicularly of the axis of said shaft (2) and said dimension (B) being appreciably greater than the diameter (D1) of said drill head (8) and projecting outwardly from the circumferentially extending outside surface of said drill head, said helical grooves (5, 6) having ends in said drill head (8) terminating at diametrically opposite sides on the circumferentially extending outside surface of said drill head and on opposite sides of said cutting plate and said helical groove ends extending generally parallel to the axis of said shaft (2) and co-extending axially with at least an axially extending part of said cutting plate spaced from said cutting tip, said cutting plate (7) having a reinforcing section (71) on each of said opposite sides of said cutting plate and spaced in the circumferential direction of said drill head from said helical groove ends, and second reinforcing sections located on diametrically opposite sides of the axis of said shaft (2), and said cutting plate (7) is secured in a recess (11) of said drill head with said recess (11) arranged between said helical groove ends in the region of said cutting plate.

2. Drilling tool, as set forth in claim 1, wherein each of said reinforcing sections (71) extend for approximately half of said dimension (B) of said cutting plate (7) on diametrically opposite sides of said axis and each to a different one of the opposite ends of said cutting plates.

3. A drilling tool, as set forth in claim 1 or 2, wherein said cutting plate (7) has an axial dimension (L) on the axis of said shaft (2) and said reinforcing sections (71) extend in the axial direction for at least part of the axial dimension (L) of said cutting plate (7).

4. A drilling tool, as set forth in claim 3, wherein said reinforcing sections (71) have a dimension in the axial direction of said shaft (2) decreasing from said axis of said shaft toward the opposite ends of said cutting plate (7).

5. A drilling tool, as set forth in claim 3, wherein said reinforcement sections (71) each having a dimension extending transversely of the opposite sides of said cutting plate (7) and increasing in the direction from the axis of said shaft (2) toward the opposite ends of said cutting plate (7).

6. A drilling tool, as set forth in claim 5, wherein each of said reinforcing sections (71) has a surface (72) located in an axially extending plane passing through the axis of said shaft and extending radially outwardly from adjacent said cutting plate to a radially outer surface of said reinforcing section.

7. A drilling tool, as set forth in claim 6, wherein the plane of said surfaces (72) form an angle (W) with a center line of said cutting plate (7) extending between the opposite ends thereof in the range of 30° to 60°.

8. A drilling tool, as set forth in claim 1 or 2, wherein said reinforcing section (71) has a radially outer surface defining an enveloping curve having a diameter (A) smaller than the dimension (B) of said cutting plate (7) between the opposite ends thereof.

9. A drilling tool, as set forth in claim 6, wherein said reinforcing sections (71) each have an axially extending second surface (73) spaced from and facing opposite to said first surface (72) and said second surface (73) being concave and located adjacent the outer ends of said cutting plate (7).

* * * * *